US012714146B2

(12) United States Patent
Yan et al.

(10) Patent No.: US 12,714,146 B2
(45) Date of Patent: Aug. 25, 2026

(54) AEROSOL GENERATING DEVICE AND HEATER

(71) Applicant: SHENZHEN FIRST UNION TECHNOLOGY CO., LTD., Shenzhen City (CN)

(72) Inventors: Dongjun Yan, Shenzhen City (CN); Zuqiang Qi, Shenzhen City (CN); Wenjuan Li, Shenzhen City (CN); Ruilong Hu, Shenzhen City (CN); Jian Wu, Shenzhen City (CN); Jiamao Luo, Shenzhen City (CN); Baoling Lei, Shenzhen City (CN); Wei Chen, Shenzhen City (CN); Xiaogang Fang, Shenzhen City (CN); Zhongli Xu, Shenzhen City (CN); Yonghai Li, Shenzhen City (CN)

(73) Assignee: SHENZHEN FIRST UNION TECHNOLOGY CO., LTD., Shenzhen City (CN)

( * ) Notice: Subject to any disclaimer, the term of this patent is extended or adjusted under 35 U.S.C. 154(b) by 539 days.

(21) Appl. No.: 17/792,676

(22) PCT Filed: Jan. 12, 2021

(86) PCT No.: PCT/CN2021/071323
§ 371 (c)(1),
(2) Date: Jul. 13, 2022

(87) PCT Pub. No.: WO2021/143689
PCT Pub. Date: Jul. 22, 2021

(65) Prior Publication Data

US 2023/0044176 A1 Feb. 9, 2023

(30) Foreign Application Priority Data

Jan. 13, 2020 (CN) ........................ 202020057718.5

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *F28F 13/18* (2013.01); *H05B 6/105* (2013.01); *H05B 11/00* (2013.01); *F28F 2245/06* (2013.01)

(58) Field of Classification Search
CPC ........ A24F 40/465; A24F 40/50; A24F 40/40; A24F 40/20; A24F 40/00; H05B 6/105; F16L 59/065
See application file for complete search history.

(56) References Cited

U.S. PATENT DOCUMENTS 9,717,277 B2 8/2017 Mironov
2015/0163859 A1* 6/2015 Schneider ............ H05B 1/0244 219/535
2017/0340016 A1* 11/2017 Thorens ................... H05B 3/42
2019/0230988 A1* 8/2019 Aoun ................... A24B 15/167
2021/0084980 A1* 3/2021 Lee ........................ H05B 6/108

FOREIGN PATENT DOCUMENTS

CN 206422941 U 8/2017
CN 107637862 A 1/2018
(Continued)

*Primary Examiner* — Alex B Efta
(74) *Attorney, Agent, or Firm* — Scully, Scott, Murphy & Presser, P.C.

(57) ABSTRACT

An aerosol generating device comprises a magnetic field generator and a heater for heating a smokable material; the heater comprises a susceptor portion and an infrared emission portion, the susceptor portion is penetrated by a magnetic field to generate heat and heat the smokable material by heat conduction, and the infrared emission portion receives the heat of the susceptor portion, and is excited by heating to radiate infrared rays to heat the smokable material. During the use of the above aerosol generating device, on the one hand, the susceptor portion generates heat by inductive
(Continued)

heating so that the smokable material is directly heated by heat conduction; and on the other hand, the infrared emission portion is excited by the heat of the susceptor portion to radiate infrared rays, thereby assisting in the heating of the smokable material, and improving the utilization efficiency of heat.

20 Claims, 5 Drawing Sheets

(51) Int. Cl.

| | |
|---|---|
| ***F28F 13/18*** | (2006.01) |
| ***H05B 6/10*** | (2006.01) |
| ***H05B 11/00*** | (2006.01) |

(56) References Cited

FOREIGN PATENT DOCUMENTS

| | | | |
|---|---|---|---|
| CN | 207927771 | U | 10/2018 |
| CN | 109805447 | A | 5/2019 |
| CN | 208941044 | U | 6/2019 |
| CN | 110613173 | A | 12/2019 |
| CN | 211910548 | U | 11/2020 |
| JP | H1-302679 | A | 12/1989 |
| JP | H4-174990 | A | 6/1992 |
| JP | 2006-246998 | A | 9/2006 |
| JP | 2019-110895 | A | 7/2019 |
| WO | 2019/157177 | A1 | 8/2019 |
| WO | 2021/108749 | A1 | 6/2021 |
| WO | 2021/249084 | A1 | 12/2021 |

* cited by examiner

AEROSOL GENERATING DEVICE AND HEATER

CROSS REFERENCE TO RELATED APPLICATIONS

The present application is a 35 U.S.C. § 371 National Phase conversion of International (PCT) Patent Application No. PCT/CN2021/071323, filed on Jan. 12, 2021, which claims priority to Chinese Patent Application No. 202020057718.5, filed with the Chinese Patent Office on Jan. 13, 2020, titled "AEROSOL GENERATING DEVICE AND HEATER", the entire contents of which are incorporated herein by reference. The PCT International Patent Application was filed and published in Chinese.

TECHNICAL FIELD

Embodiments of the present application relate to the technical field of smoking sets which are noncombustible when being heated, and in particular, relate to an aerosol generating device and a heater.

BACKGROUND

Tobacco products (e.g., cigarettes, cigars, etc.) burn tobacco to produce tobacco smoke during use. Attempts have been made to replace these tobacco-burning products by manufacturing products that release compounds without burning.

An example of such products is a heating device, which release compounds by heating instead of burning a material. For example, the material may be tobacco or other non-tobacco products, and these non-tobacco products may or may not contain nicotine. As another example, a susceptor is currently available for heating the tobacco products by surrounding the tobacco products or being inserted into the tobacco products. As a known heating device, the heat of the susceptor is only partially received by tobacco products, and the utilization efficiency of heat is low.

SUMMARY

In order to solve the problem of low heat utilization rate of heating devices in the prior art, an embodiment of the present application provides an aerosol generating device for improving the heat utilization rate of inductive heating.

Based on the above description, an aerosol generating device provided according to one embodiment of the present application is configured to heat a smokable material to generate aerosol for inhalation, and it comprises:

- a cavity, for receiving a smokable material;
- a magnetic field generator, being configured to generate a varying magnetic field;
- a heater, being configured to heat the smokable material received in the cavity; the heater comprising:

a susceptor portion, being configured to be penetrated by the varying magnetic field to generate heat so as to heat the smokable material received in the cavity; and

- an infrared emission portion, being configured to be arranged close to the susceptor portion and being capable of receiving the heat of the susceptor portion, and being configured to heat the smokable material by radiating infrared rays to the cavity when it is heated by the susceptor portion.

In a preferred embodiment, the infrared emission portion and the susceptor portion are in contact with each other so that the infrared emission portion receives heat of the susceptor portion through contact conduction.

In a preferred embodiment, at least a part of the axial extension length of the susceptor portion along the cavity coincides with the extension length of the infrared emission portion along the cavity.

In a preferred embodiment, the heater is configured in the shape of a pin or blade extending at least partially along the axial direction of the cavity.

In a preferred embodiment, the infrared emission portion is configured to be located outside the susceptor portion along the radial direction of the heater.

In a preferred embodiment, the heater comprises:

- a base, being configured in the shape of a pin extending at least partially along the axial direction of the cavity;
- the base is provided therein with a hollow space extending along the axial direction of the base, and the susceptor portion and the infrared emission portion are accommodated in the hollow space.

In a preferred embodiment, the susceptor portion extends along the axial direction of the hollow space;

- the infrared emission portion is an infrared emission coating formed on the surface of the susceptor portion or an infrared emission thin film wound on the surface of the susceptor portion.

In a preferred embodiment, the susceptor portion is configured in the shape of a pin or blade extending at least partially along the axial direction of the cavity;

- the infrared emission portion is a coating formed on the surface of the susceptor portion.

In a preferred embodiment, the heater further comprises a protective layer formed on the surface of the infrared emission portion.

In a preferred embodiment, the heater is configured in a tubular shape extending along the axial direction of the cavity and surrounding the cavity.

In a preferred embodiment, the infrared emission portion is configured to be closer to the cavity than the susceptor portion.

In a preferred embodiment, the susceptor portion is configured in a tubular shape extending along the axial direction of the cavity and surrounding the cavity;

the infrared emission portion is an infrared emission coating formed on the inner surface of the susceptor portion.

In a preferred embodiment, the heater comprises:

- a base, being configured in a tubular shape extending in the axial direction of the cavity and surrounding the cavity;
- the infrared emission portion and the susceptor portion are sequentially arranged outward along the radial direction of the base.

In a preferred embodiment, the infrared emission portion is an infrared emission coating formed on the outer surface of the base or an infrared emission thin film wound on the outer surface of the base.

In a preferred embodiment, the susceptor portion is a susceptor coating formed on the infrared emission portion; or the susceptor portion is configured as a rigid tube abutting against the infrared emission portion.

One embodiment of the present application further provides a heater for an aerosol generating device, the heater is configured to heat a smokable material to generate aerosol for inhalation, and it comprises:

- a susceptor portion, being configured to be penetrated by a varying magnetic field to generate heat, and to heat a smokable material by heat conduction; and an infrared emission portion, being configured to be arranged close to the susceptor portion and being capable of receiving the heat of the susceptor portion, and being configured to heat the smokable material by radiating infrared rays when it is heated by the susceptor portion.

During the use of the aerosol generating device described above, on the one hand, the susceptor portion generates heat by inductive heating so that the smokable material is directly heated by heat conduction; and on the other hand, the infrared emission portion is excited by the heat of the susceptor portion to radiate infrared rays, thereby assisting in the heating of the smokable material, and improving the utilization efficiency of heat.

BRIEF DESCRIPTION OF THE DRAWINGS

One or more embodiments are illustrated by pictures in corresponding attached drawings, and this does not constitute limitation on the embodiments. Elements with the same reference numerals in the attached drawings are shown as similar elements, and the pictures in the attached drawings do not constitute scale limitation unless otherwise stated specifically.

DETAILED DESCRIPTION

In order to facilitate the understanding of the present application, the present application will be described in more detail below with reference to attached drawings and detailed description.

One embodiment of the present application provides an aerosol generating device for heating instead of burning a smokable material, such as cigarettes, so as to volatilize or release at least one component of the smokable material to form aerosol for inhalation.

Figure 1:
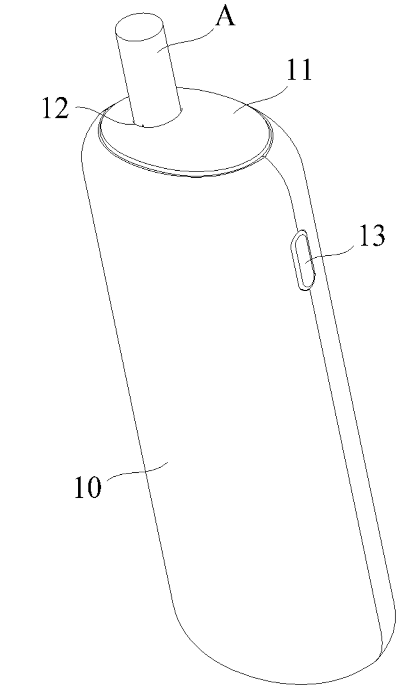
FIG. 1 is a schematic structural diagram of an aerosol generating device provided according to an embodiment.
Figure 2:
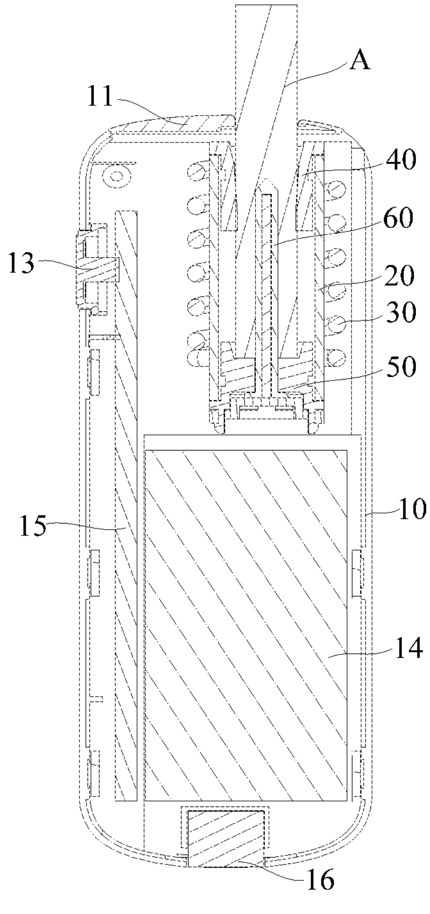
FIG. 2 is a schematic view illustrating the cross-sectional structure of the aerosol generating device in FIG. 1.

Reference may be made to FIG. 1 to FIG. 2 for the structure of the aerosol generating device provided according to an embodiment of the present application. The overall shape of the device is configured generally in the shape of a flat cylinder, and the external components of the aerosol generating device comprise:

a housing 10, which is hollow inside so as to form an assembly space for accommodating necessary functional components such as infrared radiation or the like;

an upper cover 11 located at the upper end of the housing 10 in the length direction; on the one hand, the upper cover 11 may cover the upper end of the housing 10 so that the appearance of the aerosol generating device is complete and beautiful; and on the other hand, the upper cover 11 is detachable from the upper end of the housing 10, thereby facilitating the installation, detachment and replacement of various functional components in the housing 10.

As can be further seen from FIG. 1 and FIG. 2, the upper cover 11 has an opening 12 through which the smokable material A may be at least partially received in the housing 10 along the length direction of the housing 10 to be heated, or the smokable material A may be removed from the housing 10 through the opening 12.

The housing 10 is further provided with a switch button 13 on one side in the width direction, and a user may manually actuate the switch button 13 to control the start or stop of the aerosol generating device.

Further referring to FIG. 2, the housing 10 is provided therein with:

a battery cell 14 for power supply;

a control circuit board 15 with an integrated circuit for controlling the operation of the aerosol generating device;

a charging interface 16 for charging the battery cell 14, such as a USB type-C interface or a Pin interface or the like, which is capable of charging the battery cell 14 after being connected to an external power supply or adapter.

Figure 3:
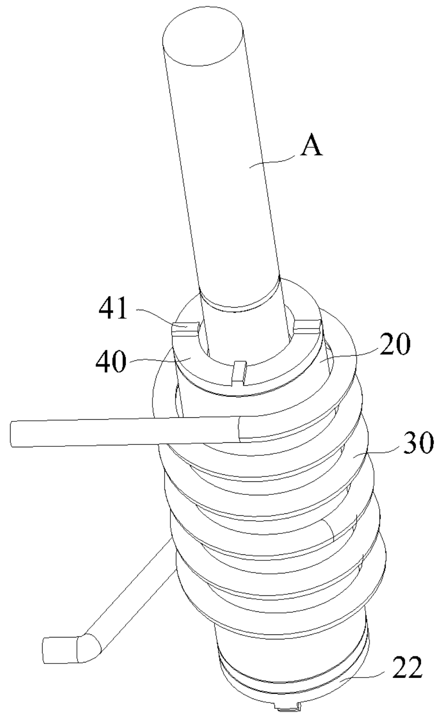
FIG. 3 is a perspective schematic view of a heating mechanism in FIG. 2 from a perspective.
Figure 4:
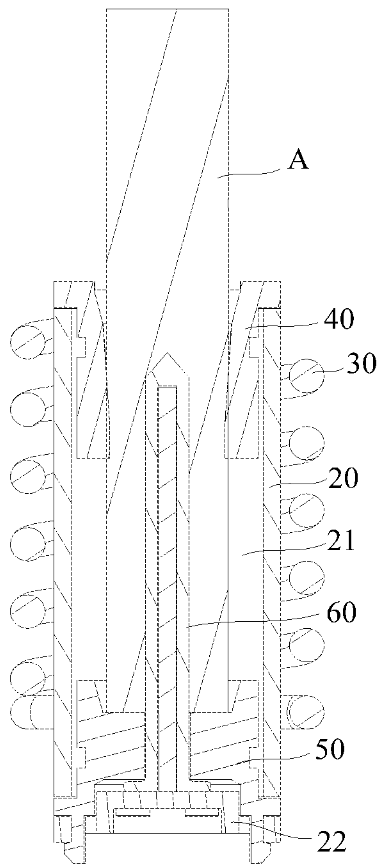
FIG. 4 is a schematic view illustrating the cross-sectional structure of the heating mechanism in FIG. 3.
Figure 5:
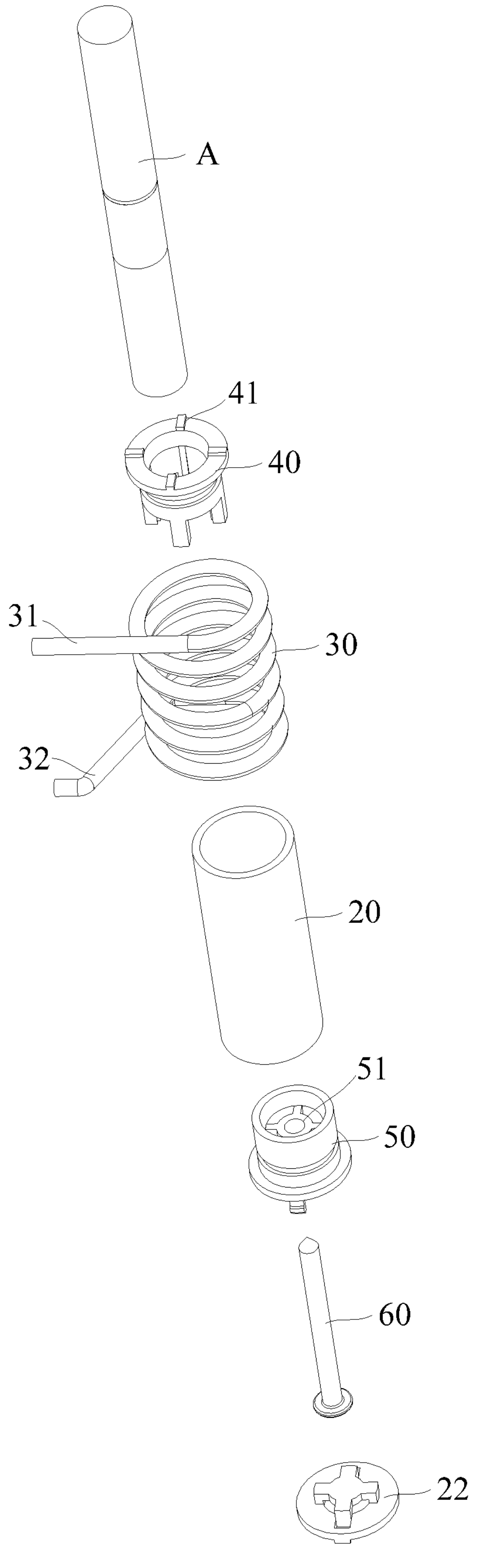
FIG. 5 is an exploded schematic view of parts of the heating mechanism in FIG. 3 before being assembled.

Further referring to the embodiment shown in FIG. 2 to FIG. 5, in order to heat the smokable material A, the housing 10 is provided therein with a heating mechanism, and reference may be made to FIG. 3 for the form and structure of the heating mechanism after being assembled. Specifically, the heating mechanism comprises:

a tubular support 20, at least a part of the tubular hollow space of the tubular support 20 forming a cavity 21 for receiving the smokable material A;

a magnetic field generator being configured to generate a varying magnetic field, wherein the magnetic field generator is an induction coil 30 wound outside the tubular support 20 along the axial direction of the tubular support 20 and is configured to generate the varying magnetic field when alternating current is supplied; as can be seen from FIG. 5, the induction coil 30 has a first conductive connection portion 31 and a second conductive connection portion 32 which may be subsequently connected with the control circuit board 15 to supply alternating current to the induction coil 30;

a heater 60 in the shape of a pin or blade, extending at least partially along the axial direction of the cavity 21, and being capable of being inserted into the smokable material A as shown in FIG. 4.

To further facilitate the installation and fixation of the heating mechanism in the housing 10, the heating mechanism further comprises:

an upper support 40 arranged at the upper end of the tubular support 20, wherein the upper support 40 is in an annular shape coaxial with the tubular support 20, and is provided thereon with a fixing structure 41 for connecting and fixing the housing 10, thereby fixing and holding the upper end of the heating mechanism in the housing 10. As can be seen from FIG. 2 and FIG. 4, the fixing structure 41 is a plurality of clamping protrusions, and correspondingly, the housing 10 is provided therein with grooves adapted to the clamping protrusions so that the upper end of the heating mechanism is fixed through engagement of the clamping protrusions and the grooves.

Of course, the smokable material A may pass through the central hole of the upper support 40 to be received in or removed from the cavity 21.

Further referring to FIG. 4 and FIG. 5, a fixing seat 50 is provided in the tubular support 20 near the lower end, and the fixing seat 50 is configured to form a portion with reduced inner diameter of the cavity 21 in the tubular support 20 so that, on the one hand, the smokable material A may abut against the fixing seat 50 to stop the movement thereof. On the other hand, as shown in FIG. 4, the fixing seat 50 is penetrated by the heater 60 and the heater 60 abuts against the fixing seat 50, so that the heater 60 can be stably installed or kept in the tubular support 20.

Specifically, referring to FIG. 5, the fixing seat 50 has a central hole 51 penetrating in the axial direction, and the central hole 51 is a mounting hole through which the heater 60 penetrates.

Further speaking, in a preferred embodiment shown in FIG. 4 and FIG. 5, the lower end of the tubular support 20 is further provided with a lower end cover 22, and the lower end cover 22 is configured to cover the lower end of the tubular support 20 so that the fixing seat 50 and the heater 60 are stably installed in the tubular support 20.

In a preferred embodiment, the tubular support 20, the fixing seat 50 and the lower end cover 22 can all be made of high-temperature resistant organic polymer materials, such as PEEK, polycarbonate, polytetrafluoroethylene or the like, or inorganic ceramic materials with good temperature resistance, such as zirconia ceramics.

In the embodiment of the present application, the heater 60 is a heater 60 which heats the smokable material A either in an electromagnetic inductive manner or in an infrared radiation manner. Specifically, further referring to FIG. 6, in a preferred embodiment, the shape and structure of the heater 60 comprise:

a base 61 made of rigid infrared-permeable quartz, glass or ceramic materials, and configured in the shape of a pin so as to be inserted into the smokable material A; of course, in order to facilitate the installation and fixing of the heater 60, the base 61 is provided thereon with a base portion 62 for abutting against and fixing with the fixing seat 50. The base 61 is provided therein with a hollow space 63 with an opening 631 for receiving a heating element 64, and the heating element 64 is encapsulated or contained in the base 61 to emit heat and radiate infrared rays.

Specifically, the heating element 64 comprises a susceptor portion, which is an elongated bar-shaped or rod-shaped susceptor 641 in this embodiment. The susceptor portion is made of a metal material with appropriate magnetic permeability that is inductively coupled with an alternating magnetic field, and it may be penetrated by a varying magnetic field to generate heat. The heat generated sequentially passes through the infrared emission coating 642 and the base 61 outward in the radial direction, and then is transferred to the smokable material A so that the smokable material A may be heated by heat conduction. The heating element 64 further comprises a thermally induced infrared emission coating 642 formed on the susceptor 641 or a thermally induced infrared emission thin film 642 wound on the susceptor 641. The infrared emission coating 642 of the heating element 64 may be excited while receiving the heat from the susceptor 641, and then radiate far infrared rays with heating effect, such as far infrared rays of 3 μm to 15 μm. When the wavelength of infrared rays matches the absorption wavelength of volatile components of the smokable material A, the energy of infrared rays is easily absorbed by the smokable material so that the smokable material A is heated.

The susceptor 641 may be made of grade 430 stainless steel (SS430), grade 420 stainless steel (SS420), and alloy materials containing iron and nickel (such as J85/J66 permalloy). It has excellent magnetic permeability, and it can be rapidly heated up under the alternating magnetic field.

The infrared emission coating 642 is made of a thermally induced infrared emission material. Specifically, the infrared emission coating 642 includes coatings made of ceramic based materials (e.g., zirconium), or Fe—Mn—Cu based materials and tungsten based materials.

In a preferred embodiment, the infrared emission coating 642 comprises, but not limited to, the following materials: carbon materials (amorphous carbon film, DLC film, graphene, carbon nanotubes, etc.), oxides $Fe_2O_3$, $Al_2O_3$, $Cr_2O_3$, $In_2O_3$, $La_2O_3$, $Co_2O_3$, $Ni_2O_3$, $Sb_2O_3$, $Sb_2O_5$, $TiO_2$, $ZrO_2$, $MnO_2$, $CeO_2$, CuO, ZnO, MgO, CaO, $MoO_3$, etc.), carbides (such as SiC, etc.), nitrides (such as TiN, CrN, AlN, $Si_3N_4$, etc.) or a combination of two or more of the above materials. The infrared emission coating 642 will radiate the far infrared rays with heating effect described above when it is heated to a proper temperature by the susceptor 641. The thickness of the infrared emission coating 642 may preferably be controlled to range from 30 μm to 50 μm. The infrared emission coating 642 may be formed on the surface of susceptor 641 by spraying the above materials on the outer surface of susceptor 641 by atmospheric plasma spraying and then curing the materials.

During the use of the heater 60 described above, on the one hand, the susceptor 641 generates heat by inductive heating so that the smokable material A is directly heated by heat conduction; and on the other hand, the infrared radiation is excited by the heat of the susceptor 641, thereby assisting in the heating of the smokable material A, and improving the utilization efficiency of heat.

Furthermore, as can be further seen from the above embodiment, when the heater 60 is inserted into the smokable material A for heating, the infrared emission coating 642 surrounds the outside of the susceptor 641, and this can ensure that the infrared rays emitted by the infrared emission coating 642 are not blocked and then smoothly radiated to the smokable material A.

Figure 6:
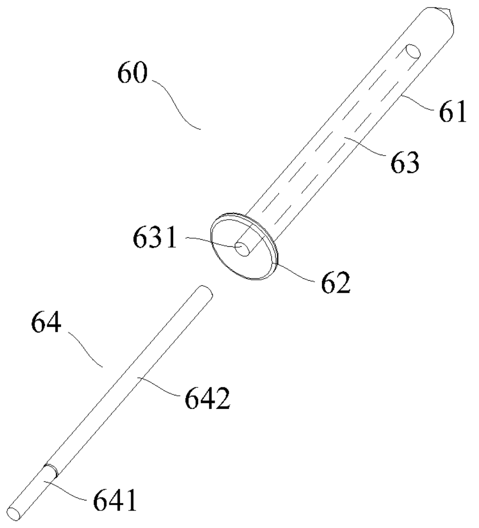
FIG. 6 is an exploded schematic view of a susceptor in FIG. 5 from another perspective.

Moreover, in the preferred embodiment shown in FIG. 6 above, the length of the susceptor 641 extending along the axial direction of the heater 60 is larger than the length of the infrared emission coating 642, so that the susceptor 641 can be utilized by the infrared emission coating 642 to the maximum extent in the heat transmission path or direction, thereby exciting infrared light.

Figure 7:
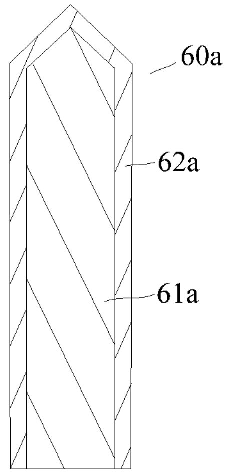
FIG. 7 is a schematic structural diagram of a susceptor provided according to another embodiment.

Furthermore, in yet another modified embodiment of the heater **60*a* shown in FIG. 7, the heater 60*a* comprises a susceptor portion and an infrared emission coating 62*a* formed on the outer surface of the susceptor portion. In this embodiment, the susceptor portion is a pin or blade-shaped induction heating portion 61*a*. During use, the induction heating portion 61*a* is penetrated by the varying magnetic field to generate heat, and at the same time, the thermally induced infrared emission coating 62*a* is heated up and excited to radiate infrared rays. When the susceptor 60*a*** is inserted into the smokable material A, on the one hand, it may transfer heat to the smokable material A by contact conduction, and on the other hand, it can radiate infrared rays to heat the smokable material A.

Of course, in a more preferred embodiment, an infrared-permeable protective layer (not shown in the figure) such as a layer of glass may be added or formed outside the infrared emission coating 62*a* for the heater 60*a* shown in FIG. 7.

Figure 8:
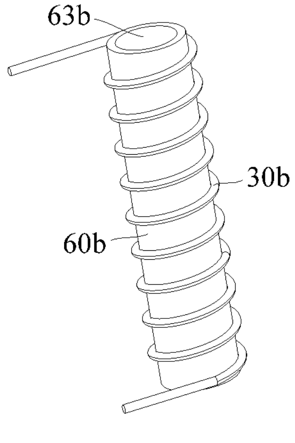
FIG. 8 is a schematic view of a heating mechanism provided according to yet another embodiment.
Figure 9:
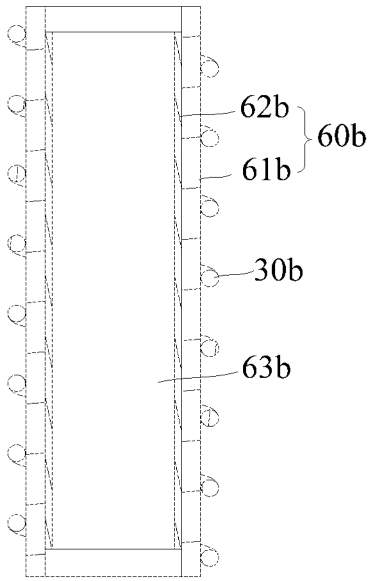
FIG. 9 is a schematic view illustrating the cross-sectional structure of the heating structure in FIG. 8.

In yet another variant embodiment, as shown in FIG. 8 and FIG. 9, the heating mechanism comprises a tubular heater 60*b*, and an induction coil 30*b* surrounding the heater 60*b* and inductively coupled with the heater 60*a* for generating a varying magnetic field;

the tubular hollow space of the heater 60*b* forms a cavity 63*b* for accommodating and heating the smokable material A.

Further referring to FIG. 9, the heater 60*b* comprises:

a susceptor portion, which may be penetrated by the varying magnetic field to generate heat as a tubular induction heating portion 61*b;* and a thermally induced infrared emission coating 62*b* formed on the inner surface of the induction heating portion 61*b*, wherein the infrared emission coating 62*b* may be heated by the induction heating portion 61*b* to radiate infrared rays to the smokable material A in the cavity 63*b*.

Figure 10:
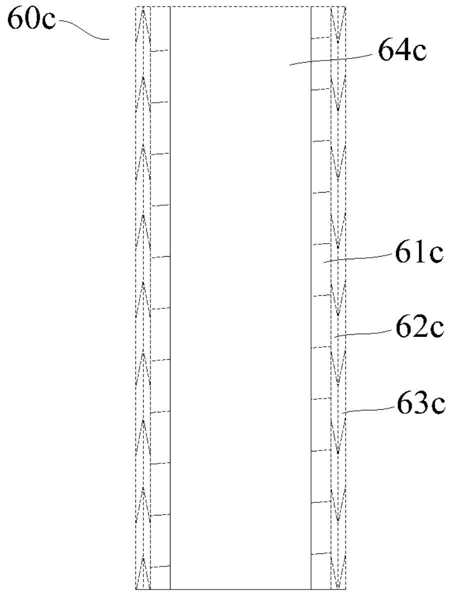
FIG. 10 is a schematic structural diagram of a heater provided according to a further embodiment.

In yet another optional embodiment, the susceptor portion may be in the form of a coating or a thin film. For example, the structure of the heater 60*c* may be as shown in FIG. 10, and it comprises:

a tubular base 61*c* which is hollow inside to form a cavity 64*c* for accommodating and receiving the smokable material A; wherein the tubular base 61*c* is made of infrared-permeable materials such as quartz, glass or ceramic;

an infrared emission coating 62*c* formed outside the tubular base 61*c;* a susceptor heating coating 63*c* further formed outside the infrared emission coating 62*c*; wherein the susceptor heating coating 63*c* is made of an inductive metal material that generates heat through induction, and may be penetrated by a varying magnetic field to generate heat so that the infrared emission coating 62*c* is heated to radiate infrared rays into the cavity 64*c*, thereby heating the smokable material A.

In other variant embodiments, the infrared emission coating 62*c* described above may also adopt an infrared emission thin film, such as a zinc oxide thin film, a graphene thin film, or an indium oxide thin film doped with rare earth metal, or a composite thin film formed with infrared emitting materials on flexible thin film substrates such as polyimide, ceramic paper, and flexible glass. Moreover, the corresponding susceptor heating coating 63*c* may be correspondingly changed into the form of a rigid tube made of magnetically conductive metal or alloy.

As can be further seen from the embodiment shown in FIG. 7 to FIG. 10, when the heater is tubular around the smokable material A, the infrared emission portion is located in the induction heating portion and closer to the smokable material A, so that the infrared energy emitted by the infrared emission portion can be radiated into the smokable material A without being blocked or absorbed by the induction heating portion.

It shall be noted that, the specification and attached drawings of the present application show preferred embodiments of the present application. However, the present application is not limited to the embodiments described in this specification. Further speaking, those of ordinary skill in the art can make improvements or variations according to the above description, and all these improvements and variations shall fall within the scope claimed in the appended claims of the present application.

What is claimed is:

1. An aerosol generating device for heating a smokable material to generate aerosol for inhalation, comprising:

a cavity, for receiving a smokable material;

a magnetic field generator, being configured to generate a varying magnetic field;

a heater, being configured to heat the smokable material received in the cavity; the heater comprising:

a susceptor portion being configured to be penetrated by the varying magnetic field to generate heat, and to heat the smokable material received in the cavity by heat conduction; and an infrared emission portion being configured to be arranged next to the susceptor portion and being capable of receiving the heat transferred by the susceptor portion, and being configured to radiate infrared rays to the cavity to heat the smokable material when it is heated by the susceptor portion;

wherein the infrared emission portion is disposed closer to the smokable material than the susceptor portion when the smokable material is inserted into the cavity;

the infrared emission portion is made from a material selected from a group consisting of amorphous carbon film, DLC film, graphene, carbon nanotubes, $Fe_2O_3$, $Cr_2O_3$, $In_2O_3$, $La_2O_3$, $Co_2O_3$, $Ni_2O_3$, $Sb_2O_3$, $Sb_2O_5$, $TiO_2$, $MnO_2$, $CeO_2$, CuO, ZnO, MgO, CaO, $MoO_3$, SiC, TiN, CrN, AlN and $Si_3N_4$.

2. The aerosol generating device according to claim 1, wherein the susceptor portion and the infrared emission portion are in contact with each other so that the susceptor portion transfers heat to the infrared emission portion through contact conduction.

3. The aerosol generating device according to claim 1, wherein at least a part of an axial extension length of the susceptor portion along the cavity coincides with an extension length of the infrared emission portion along the cavity.

4. The aerosol generating device according to claim 1, wherein the heater is configured in the shape of a pin or blade extending at least partially along an axial direction of the cavity.

5. The aerosol generating device according to claim 4, wherein the infrared emission portion is configured to be located outside the susceptor portion along a radial direction of the heater.

6. The aerosol generating device according to claim 4, wherein the heater comprises:

a base, being configured in the shape of a pin extending at least partially along the axial direction of the cavity;

the base is provided therein with a hollow space extending along the axial direction of the base, and the susceptor portion and the infrared emission portion are accommodated in the hollow space.

7. The aerosol generating device according to claim 6, wherein the susceptor portion extends along the axial direction of the hollow space;

the infrared emission portion is an infrared emission coating formed on the surface of the susceptor portion or an infrared emission thin film wound on the surface of the susceptor portion.

8. The aerosol generating device according to claim 4, wherein the susceptor portion is configured in the shape of a pin or blade extending at least partially along the axial direction of the cavity;

the infrared emission portion is a coating formed on the surface of the susceptor portion.

9. The aerosol generating device according to claim 8, wherein the heater further comprises a protective layer formed on the surface of the infrared emission portion.

10. The aerosol generating device according to claim 1, wherein the heater is configured in a tubular shape extending along an axial direction of the cavity and surrounding the cavity.

11. The aerosol generating device according to claim 10, wherein the infrared emission portion is configured to be closer to the cavity than the susceptor portion.

12. The aerosol generating device according to claim 10, wherein the susceptor portion is configured in a tubular shape extending along the axial direction of the cavity and surrounding the cavity;

the infrared emission portion is an infrared emission coating formed on the inner surface of the susceptor portion.

13. The aerosol generating device according to claim 10, wherein the heater comprises:

a base, being configured in a tubular shape extending in the axial direction of the cavity and surrounding the cavity;

the infrared emission portion and the susceptor portion are sequentially arranged outward along a radial direction of the base.

14. The aerosol generating device according to claim 13, wherein the infrared emission portion is an infrared emission coating formed on the outer surface of the base or an infrared emission thin film wound on the outer surface of the base.

15. The aerosol generating device according to claim 14, wherein the susceptor portion is a susceptor coating formed on the infrared emission portion; or the susceptor portion is configured as a tube abutting against the infrared emission portion.

16. A heater for heating a smokable material to generate aerosol for inhalation, comprising:

a susceptor portion, being configured to be penetrated by a varying magnetic field to generate heat, and to heat the smokable material by heat conduction; and an infrared emission portion, being configured to be arranged next to the susceptor portion and being capable of receiving the heat of the susceptor portion, and being configured to radiate infrared rays to heat the smokable material when it is heated by the susceptor portion;

a base, being configured in a tubular shape extending in an axial direction of the aerosol generating device and surrounding a cavity formed in the aerosol generating device and configured to receive the smokable material therein; wherein the infrared emission portion and the susceptor portion are sequentially arranged outside the base along a radial direction of the base.

17. The aerosol generating device according to claim 2, wherein the heater is configured in the shape of a pin or blade extending at least partially along an axial direction of the cavity.

18. The aerosol generating device according to claim 3, wherein the heater is configured in the shape of a pin or blade extending at least partially along an axial direction of the cavity.

19. The aerosol generating device according to claim 2, wherein the heater is configured in a tubular shape extending along an axial direction of the cavity and surrounding the cavity.

20. A heater for heating a smokable material to generate aerosol for inhalation, comprising:

a susceptor portion being configured to be penetrated by a varying magnetic field to generate heat, and to heat the smokable material by heat conduction; and an infrared emission portion being configured to be arranged next to the susceptor portion and being capable of receiving the heat of the susceptor portion, and being configured to radiate infrared rays to heat the smokable material when it is heated by the susceptor portion;

wherein the infrared emission portion is disposed closer to the smokable material than the susceptor portion when the smokable material is inserted into the aerosol generating device;

the infrared emission portion is made from a material selected from a group consisting of amorphous carbon film, DLC film, graphene, carbon nanotubes, $Fe_2O_3$, $Cr_2O_3$, $In_2O_3$, $La_2O_3$, $Co_2O_3$, $Ni_2O_3$, $Sb_2O_3$, $Sb_2O_5$, $TiO_2$, $MnO_2$, $CeO_2$, CuO, ZnO, MgO, CaO, $MoO_3$, SiC, TiN, CrN, AlN and $Si_3N_4$.

* * * * *